United States Patent
Eshghavi (10) Patent No.: US 11,605,390 B2
(45) Date of Patent: Mar. 14, 2023

(54) SYSTEMS, METHODS, AND APPARATUS FOR LANGUAGE ACQUISITION USING SOCIO-NEUOROCOGNITIVE TECHNIQUES

(71) Applicant: Malihe Eshghavi, San Francisco, CA (US)

(72) Inventor: Malihe Eshghavi, San Francisco, CA (US)

( * ) Notice: Subject to any disclaimer, the term of this patent is extended or adjusted under 35 U.S.C. 154(b) by 71 days.

(21) Appl. No.: 17/009,633

(22) Filed: Sep. 1, 2020

(65) Prior Publication Data

US 2022/0068283 A1      Mar. 3, 2022

(51) Int. Cl.
*G10L 17/26* (2013.01)
*G10L 15/00* (2013.01)
*G10L 15/07* (2013.01)
*G06N 20/00* (2019.01)

(52) U.S. Cl.
CPC ............. *G10L 17/26* (2013.01); *G06N 20/00* (2019.01); *G10L 15/005* (2013.01); *G10L 15/07* (2013.01)

(58) Field of Classification Search
CPC ....... G10L 17/26; G10L 15/005; G10L 15/07; G06N 20/00
USPC .......................................................... 704/236
See application file for complete search history.

(56) References Cited

U.S. PATENT DOCUMENTS

| | | | | |
|---|---|---|---|---|
| 8,457,959 B2* | 6/2013 | Kaiser | ................... | G09B 19/04 704/231 |
| 9,672,827 B1* | 6/2017 | Jheeta | ................... | G06F 16/338 |
| 11,145,217 B2* | 10/2021 | Chen | ................... | G09B 5/06 |
| 11,222,627 B1* | 1/2022 | Qian | ................... | G09B 19/06 |
| 2003/0208353 A1* | 11/2003 | Ueda | ................... | G09B 17/00 704/4 |
| 2004/0209231 A1* | 10/2004 | Merritt | ................... | G09B 17/00 434/156 |
| 2005/0250080 A1* | 11/2005 | Friend | ................... | G09B 7/02 434/236 |
| 2006/0111902 A1* | 5/2006 | Julia | ................... | G10L 15/26 704/E15.045 |
| 2007/0015121 A1* | 1/2007 | Johnson | ................... | G09B 7/02 434/156 |
| 2008/0037534 A1* | 2/2008 | Shina | ................... | H04M 3/4938 370/389 |
| 2008/0182230 A1* | 7/2008 | Stone | ................... | G09B 19/00 434/167 |
| 2008/0286730 A1* | 11/2008 | Romero, Jr. | ................... | G09B 5/06 345/473 |
| 2008/0293020 A1* | 11/2008 | Jang | ................... | G09B 19/06 434/157 |
| 2008/0306738 A1* | 12/2008 | Lee | ................... | G09B 19/04 704/E15.045 |
| 2009/0023119 A1* | 1/2009 | Breidner | ................... | G09B 19/08 434/157 |
| 2009/0083637 A1* | 3/2009 | Skakkebaek | ................... | G06Q 10/10 715/751 |
| 2009/0104590 A1* | 4/2009 | Yang | ................... | G09B 19/04 434/317 |
| 2010/0017718 A1* | 1/2010 | Bohms | ................... | G11B 27/34 715/719 |
| 2011/0053123 A1* | 3/2011 | Lonsdale | ................... | G09B 5/06 434/157 |
| 2014/0039871 A1* | 2/2014 | Crawford | ................... | G06F 40/103 704/2 |

(Continued)

*Primary Examiner* — Thuykhanh Le (57) ABSTRACT

Provided are various mechanisms and processes for language acquisition using socio-neurocognitive techniques.

17 Claims, 3 Drawing Sheets

(56) References Cited

U.S. PATENT DOCUMENTS

| | | | |
|---|---|---|---|
| 2014/0302464 A1* | 10/2014 | Cai | G09B 5/04 |
| | | | 434/157 |
| 2015/0017617 A1* | 1/2015 | Jones | G09B 19/06 |
| | | | 434/157 |
| 2015/0142434 A1* | 5/2015 | Wittich | G10L 21/10 |
| | | | 704/235 |
| 2015/0356887 A1* | 12/2015 | Mathias | G06F 3/04883 |
| | | | 715/810 |
| 2016/0086508 A1* | 3/2016 | McCormick | G06F 3/04817 |
| | | | 434/169 |
| 2016/0133154 A1* | 5/2016 | Cortes | G09B 5/00 |
| | | | 434/157 |
| 2016/0155357 A1* | 6/2016 | Chan | G09B 19/06 |
| | | | 434/157 |
| 2016/0225187 A1* | 8/2016 | Knipp | G06T 19/006 |
| 2016/0267811 A1* | 9/2016 | Donohue | G09B 19/06 |
| 2017/0053541 A1* | 2/2017 | Tsyrina | G09B 5/02 |
| 2017/0068986 A1* | 3/2017 | Chan | G06Q 30/0245 |
| 2017/0330479 A1* | 11/2017 | Bowman | G09B 7/04 |
| 2018/0061274 A1* | 3/2018 | Frahling | G06F 40/247 |
| 2019/0206406 A1* | 7/2019 | Sugiyama | B25J 13/08 |
| 2019/0347948 A1* | 11/2019 | Gill | G06F 9/453 |
| 2020/0211417 A1* | 7/2020 | Huang | G10L 15/26 |
| 2020/0242134 A1* | 7/2020 | Salhin | G06F 16/906 |
| 2021/0014575 A1* | 1/2021 | Selfors | H04N 21/4856 |
| 2021/0016431 A1* | 1/2021 | Kim | B25J 9/161 |
| 2021/0225198 A1* | 7/2021 | Cummings | G09B 7/08 |
| 2021/0233427 A1* | 7/2021 | Pesta | G09B 5/065 |
| 2021/0304024 A1* | 9/2021 | Baughman | H04L 67/535 |
| 2022/0238039 A1* | 7/2022 | Nam | G09B 19/22 |
| 2022/0262270 A1* | 8/2022 | Kobayashi | G09B 1/02 |

\* cited by examiner

SYSTEMS, METHODS, AND APPARATUS FOR LANGUAGE ACQUISITION USING SOCIO-NEUOROCOGNITIVE TECHNIQUES

TECHNICAL FIELD

The present disclosure generally relates to language acquisition. In particular, language acquisition using socio-neurocognitive techniques.

DESCRIPTION OF RELATED ART

Previous language learning techniques typically emphasize only one particular language learning modality. The result can be that language learners learn aspects of the language passively but not actively. Although a wide range of methods and techniques which focus on teaching second language exist, there is still a gap in current language instruction that can help language learners become more productive.

BRIEF DESCRIPTION OF THE DRAWINGS

The disclosure may best be understood by reference to the following description taken in conjunction with the accompanying drawings, which illustrate particular embodiments of the present invention.

DETAILED DESCRIPTION OF PARTICULAR EMBODIMENTS

The disclosure may best be understood by reference to the following description taken in conjunction with the accompanying drawings, which illustrate particular embodiments of the present invention.

The present disclosure relates generally to second language acquisition, bilingualism and brain plasticity and aging, and more specifically to educational technology. As human beings age, cognitive abilities, such as language processing, memory, executive and word-finding functions can show signs of noticeable degradation.

Many studies suggest that the long-term experience of speaking and managing two languages may have neuroprotective effects against cognitive decline and brain aging. Nowadays, there is an indication that being bilingual or multilingual trending. In a world in which people increasingly travel and live in other countries, bilingualism and multilingualism can take on an increasing significant aspect of modern life.

Many second language learners who attend language classes often complain that they cannot adequately retrieve already-acquired language knowledge in order to apply it in a real-world context. Unfortunately, second language learners may easily lose information obtained in the language class if they do not make the conscious and determined effort to retain and use it. In tandem, one aspect of second language education that the more complex brain networks are, the better language learners are able to effectively retain the language.

Advances in social media and technology (e.g., iPhones and big data capabilities) can allow for many language learning platforms and applications. These language learning applications and platforms have posed practical challenges in such areas as language acquisition. Most educational studies on L2 learning focus on human teacher-student dyadic constellations or peer collaborations in task-oriented activities. Studies on conversation, where teacher and student contributions are analyzed as those of a party, rather than as individual contributions, are still scarce.

Robots can play a role as a language learning aid tool. While the role of robots are not deniable, there are still lot of work to make robots to be effective language tutors. Hence, there is a need for both robot-functions and mechanical features and the language methods that can be employed with them to make them an effective second language acquisition assistant. An effective language method can be employed through robots to allow language learners not only to comprehend a language but also to recall and use the language in their communications.

In view of the foregoing disadvantages, some of the disclosed techniques provide second language methods employable in a robot utilized in providing effective language learning without the need for a human mediator to operator for the robot. The device can help a broad age range of language learners, K-12 to 80+ years old. The device can help not only second language learners to learn a second language but also can be programmed to help patients with cognitive illnesses such as dementia and aphasia to rehabilitate and improve their language atrophy and to retrieve their language loss. The device can provide for brain plasticity development and language learning for K12+, delaying brain aging for adult second language learners, and neurodegenerative disease to retrieve the language that they lost due to aphasia and dementia.

The device can function in different ways based on the role in which it will function. It can act as a pet, a friend (language learning assistant) or speech therapist, and its function can be different based on the individuals' age and brain healthiness. While the device is multifunctional, the, in some implementations, the device might be configured primarily to help healthy people to learn a second language by having a natural interaction with the device in settings such as the home. Alternatively, it can be a speech therapist utilized with specific courses and used for people with dementia or aphasia.

In some implementations, some of the disclosed techniques include some or all of the cognitive theory of multimedia learning: metacognition in relation to language learning; and sociocultural theory. In some implementations, a combination of the neurocognitive, metacognitive and sociocultural techniques confirmed a statistically positive impact on the learning, recall and use of the second language by the experimental group of adult English learners as compared with the control group. Some of the disclosed techniques can advance an educator's understanding in this foundational area of second language acquisition. In addition, some of the disclosed techniques provide effective application in language learning and recall for adult ESL learners with a range of different backgrounds and diversity.

In some implementations, the socio-neurocognitive techniques include a pictorial auditory technique, a multisensory drawing technique, a circle rotation technique, and a storytelling technique. In some implementations, a combination of these techniques can allow for a convergence and interrelatedness so as to suit a range of diverse English learners.

Figure 1:
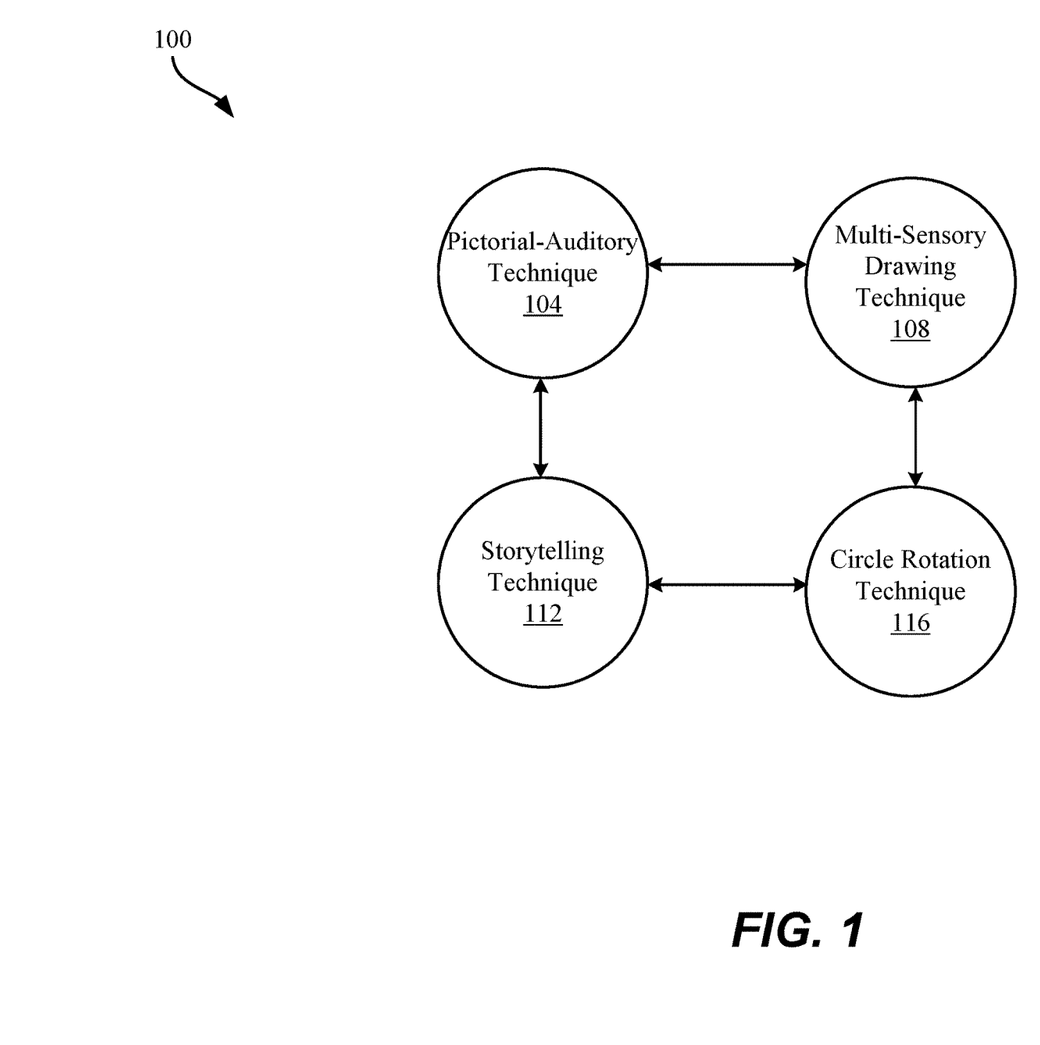
FIG. 1 illustrates one example of a process for performing techniques used for language acquisition using socio-neurocognitive techniques.

FIG. 1 shows the Socio-Neurocognitive method with one example of four sub-techniques utilized in some implementations. As illustrated in FIG. 1, the four techniques (the pictorial auditory 104, multisensory drawing technique 108, circle rotation 116 and storytelling techniques 112) are intertwined surrounding the principal notion of the socio-neurocognitive method. Yet it may be argued that these language instruction techniques are as closely knit with each other as with the main method (socio-neurocognitive method). In some cases, the combination of these techniques has shown a beneficial purpose and productivity for adult ESL learners to obtain, retain and recall the language, successfully transferring more passive knowledge into active usage and communication. Through these techniques, language learners can learn better and be more understanding of the target words of the English language, but also more able to pass along this receptive language knowledge into the productive skills of writing and speaking. It should be noted that the order in which these techniques are performed can be dynamic. For example, the techniques might be performed as follows: pictorial auditory 104, multisensory drawing 108, circle storytelling techniques 112, and circle rotation 116. Alternatively, and circle rotation 116, circle storytelling techniques 112, multisensory drawing 108, and pictorial auditory technique 104. A variety of other combinations can also be used.

In some implementations, the pictorial auditory technique is a multisensory technique. New language can be presented with visual tools such as a picture, short video, or animation, along with the written form of the language and pronunciation. Using multidimensional modes of communication through the pictorial auditory technique can enhance language learning so that the multisensory mode provides a benefit to facilitate comprehension and internalization of the language.

The pictorial auditory technique can be based on simultaneous dual presentation modes.

In some implementations, the pictorial auditory technique entails the process of receiving new language knowledge as input, and connecting the meaning to the output system through verbal (aural or written) and visual stimuli. This technique fosters communicative competence in the target language, which includes comprehension of the cultural and situational context of such communication.

This dual channel principle suggests that humans have two separate information processing channels (auditory/verbal and visual/pictorial). Information such as spoken and written forms, narrations, and sounds is received via the auditory/verbal channel through the ear; information such as pictures, graphs, videos/animation clips, and on-screen texts is received via the visual/pictorial channel through the eyes.

In some implementations, a second subdivision of socio-neurocognitive technique is the multisensory drawing technique, which enhances information processing in various ways visually and kinesthetically. A drawing of a situation as stated by the target language and a description of it by the language learner is a powerful way to boost the learner's memory, leading to long term learning and retention. Drawing the target words, while pronouncing and visualizing images of the context simultaneously, affect a student's ability to remember the newly learned language more thoroughly. Indeed, the benefits of the multisensory drawing technique is that since it is not and should not be dependent on or exercised with any emphasis on a student's level of drawing talent. This technique may work for all language learners, not just ones who are able to draw well. The multisensory drawing technique can provide a remarkable boost to language learners' ability to remember what they were learning. Drawing results in better recall when a language learner draws a situation in a second language, the target language information is encoded in the memory in a very systemic way—layering the visual memory of the language, the kinesthetic memory of their hand drawing the image of the target language, and the semantic memory which engages the language learner in meaning-making. Both quantitative and qualitative results derived in dissertation study indicated that the participants' engagement in mental image drawing resulted in the best recall performance. Drawing forced the ESL learners to process information in multiple ways including visually, kinesthetically, and semantically. In some implementations, the robot in which some of all of the disclosed techniques are implemented can include an interactive screen configured to receive input from the user. In some implementations, this input includes drawn images by the user of the device.

In some implementations, a third subdivision of the socio-neurocognitive method is the circle rotation technique, which aims to help language learners acquire new words better while engaging in physical and sociocultural interactions. When a language learner walks, stands and mingles with the robot while the learner and robot verbally interact with each other using the newly learned language, this fosters greater cognitive ability more efficiently. This enhances the deep learning process which is assisted by physical movement when the main region of the brain responsible for motor skills is activated. For example, the cerebellum is activated during physical movement and its function is visual processing, spatial perception, and cognitive abilities. This means that when a language learner uses the social brain areas to engage in physical movements and uses the newly learned language in communication with the robot, the learner is also making the learning process more retainable in long-term memory through these cultural and social interactions and exchanges. The circle rotation technique can help language learners to activate their language and movement brain areas (Broca's and cerebellum) which appear to play a role in the generation of coherent sequences of body movements and language production. The language learning and recall of the target language through the circle rotation technique can align with neurophysiological evidence suggesting that, in adults, physical movement and speech are inextricably linked in the brain.

In some implementations, a further subdivision of the socio-neurocognitive method is storytelling. The storytelling technique provides the opportunity for a language learner to both create and listen to stories that incorporate the newly learned language. The "language network" in the brain can become consistently activated when people listen to narratives. Through storytelling the language-processing parts in the brain can be activated. Moreover, stories activate multiple senses in the brain: motor; auditory; olfactory; somatosensory; and visual. In some cases, since the storytelling technique can stimulate the language learners to incorporate newly learned language in their stories, it becomes easier for the brain to imagine, elaborate and recall the information in the target language later.

The socio-neurocognitive method—as a framework emanating from the neurocognitive, metacognitive and social cultural concepts—can include the holistic aspects of language learning instead of emphasizing only one modality of teaching a second language.

Based on the dissertation's findings and evidence, the socio-neurocognitive method is an effective method to employ in a robot since the method engages language learners in the learning process and requires learners to be active learners and interact with the robot while thinking about what they are doing and learning as individuals (metacognition), pairs, or structured groups. The socio-neurocognitive method allows for both strengthening the language learner's input and, more importantly, building up output layers of the student's learning by engaging in social interaction and communication with the robot in any comfortable setting and time. The benefits of the socio-neurocognitive method include the following: focus on a language learner's active learning; improving second language retention; development of personal and interpersonal communication and higher hierarchy of thinking skills. The core element of the Socio-neurocognitive method is focus on language learners' interactions rather than on learning as a solitary activity.

The role of holistic learning, integrating the neurocognitive and social interactions in language learning, has thus far been widely overlooked. The claims that this new Socio-neurocognitive method provides multisensory learning that can help to disambiguate the meaning of a new language; analogously, collaborative learning represents one of the easiest ways for learners to learn new languages and can enable long-term retention by social interaction. The Socio-neurocognitive method promotes interactive language learning to foster long-term language recall and usage.

Compared to previous technologies and robots, a robotic device as discussed herein utilizes the above-mentioned techniques through different forms of interaction and communication. In some implementations the general appearance of the device is robot-like, while lip and mouth movements can be human-like, e.g., concerning place of articulation and native-like pronunciation. The face of the device can display human like expressions to show both emotions and even turn taking. In some cases, most of the robotic device's emotions would be conveyed through its eyes as well. In other cases, the body language of the robotic device would be through the hands as well. For example, when a language learner is talking, the robotic device can fold its hands or even put one hand below the chain in order to show that it is listening to the language learner. These realistic body features as well as the body language is important for both language learners as well as, e.g., individuals with brain atrophy. Through the robotic device's realistic mouth and lips movement, the patient and/or student can clearly visualize the place of articulation of phonological pronunciation and try to mimic the robot.

The head of the robotic device can show a variety of human face gestures, and its neck with a servo motor can help provide movement to the head of the device. The robotic device as a speech therapist can interact with the patient and help the patient to retrieve language by interacting with the patient through both visual aids such as pictures and verbal communication. There is a screen on the robot chest with a function similar to Siri. When a learner commands the robot and asks a question, the robot can write the learner's speech in a correct form. Or when the robot uses a new word, then the written word can appear on the chest screen for the learner to see. The robotic device can recognize the natural voice commands and learns from a learner's behavior and routines to provide proper language and information. All of these functions are possible through machine learning and artificial intelligence. This screen embedded onto the device's chest has this function to illustrate the picture of the word and even the written form of the word. This function is very useful both for children and adults as it is based on the pictorial auditory technique described above. The robotic device can be set-up to engage in a realistic social conversation with a learner, utilizing the full set of four techniques as described above.

The robotic device can utilize spatial and kinesthetic referencing. For the social dimension, the setting allows the learner to have a social and real interaction with the robot through interpersonal, collaborative language learning, The cognitive dimension of learning is straight forward, and the robot is programed to have realistic social conversations on selected topics that would help the learner to transfer the new information/language from short-term memory into long-term memory. The robot may get the learner to rehearse that specific information back and forth and help the learner to retrieve the information even later on from long-term memory.

In some implementations, the robotic device can adapt itself to the learner's needs and identify the target learner level of language. Thus, the robot is able to hold a social conversation that can be meaningful from a learning perspective by the learner, and all this is possible through artificial intelligence that makes the device perceived to be both smart and social. The robot that can converse coherently and engagingly with learners on a wide range of topics such as food, sports, entertainment, and even fashion.

A learner can choose the robot interaction based on L2 level. They would have options to select the speaking rate and complexity of utterances, and clarification or repetition by the robot. The robot has a personal background such as hobbies; food, travel, film, book and sports preferences and even would be able to ask questions and even answer social questions (of the same type it is asking the participants) and provide information about itself, regardless of the present dialogue state.

Through transparency in what topics the robot has in its inputs, the learners will know this through the topic menu, and they will get the idea of a mental model of the robot's capabilities. The memory of the robotic device can be designed for a long-term interaction. For example, when a learner has an interaction with the robot, and this interaction is interrupted midway through the interaction, the robot to can remember the learner's most recent interaction or previous answers and use them properly at the moment in conversation.

In some implementations, the memory of the robotic device is generated to keep track of what topics have already been worked with a returning learner, and what information the learner has provided previous responses. The robot, automatically through machine learning or even manually, can update the utterances and can conduct transitions.

In some implementations, the robotic device includes further technological features. For example, the device might be able to adjust itself as to the speech synthesis speed. The robot can speak faster or slower based upon the learner's needs. This might be adjusted manually through touch or voice from a user or automatically by the device itself. The robotic device can also have the ability to have audiovisual detection adaptation to learner engagement, recognizing the learner's face expressions and body posture. Also or alternatively, the robotic device can audio record the learner's voice and track how the learner perceives the current state of the dialogue, thus allowing for possible standard technology for facial feature tracking. In some implementations, these techniques might be implanted using or more of the following software development kits: OpenFace & OpenVokaturi SDK9.

Natural language processing systems and artificial intelligence play can be used to the robotic device perceived to have intelligence. For instance, chatbots can be used to carry on extended conversations with the goal of mimicking the unstructured conversations of robot-human interaction. In some implementations, the robotic device can utilize machine learning techniques such as a corpus-based systems and mine large datasets of conversations; using information retrieval-based systems to mimic a human's response from a previous conversation; or by using a machine translation paradigm such as neural network sequence-to-sequence systems learn to map from a learner utterance to a response.

In some further implementations, the robotic device is controlled through a remote control. In some cases, the remote control might be the primary mode control over the robotic device by a language learners or patient. In some implementations, a remote control can have the following functions: course/topic menu, power button, voice volume, movement buttons for four directions, small turnings, and sitting or standing, smart board screen for the learner or patient to interact with the robot through writing, etc. It should be noted that other functions are possible, which could be implanted by the those skilled in the art.

Figure 2:
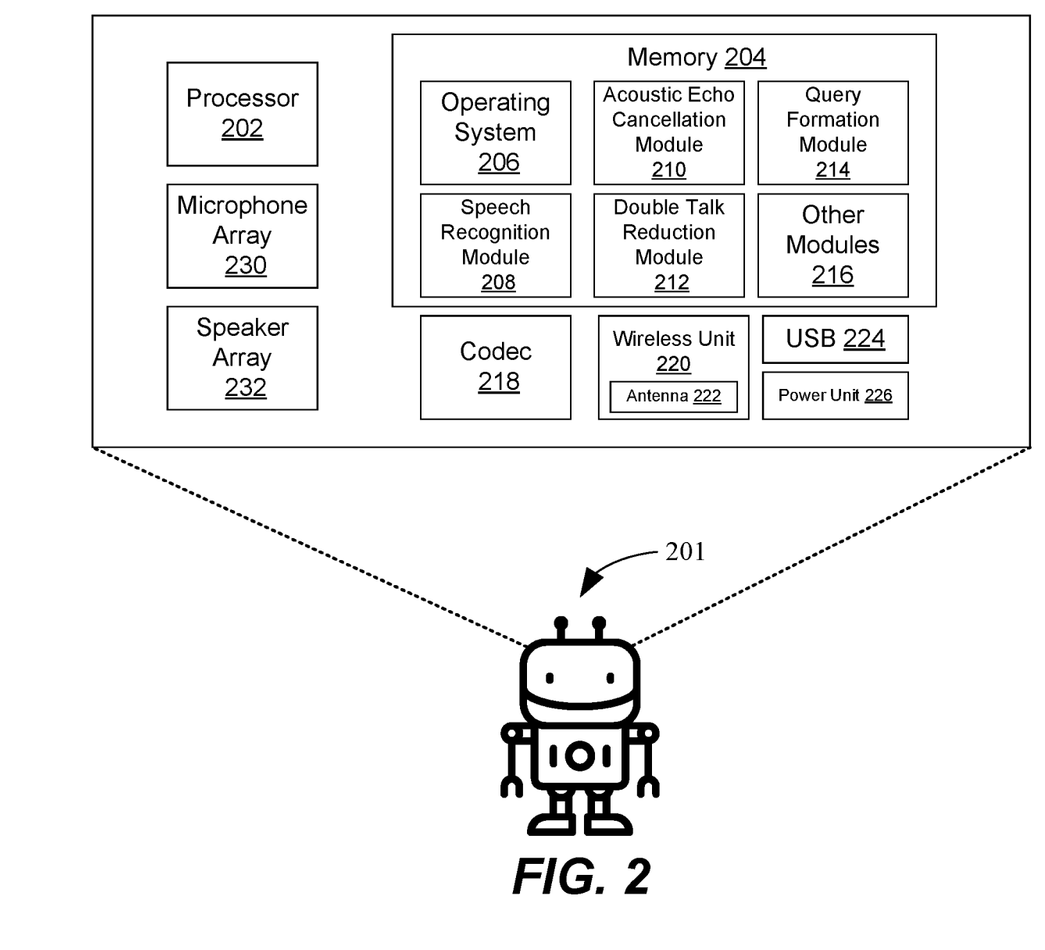
FIG. 2 shows a block diagram of selected functional components implemented in a robotic device.

FIG. 2 shows selected functional components of the robotic device 201 in more detail. Generally, the robotic device 201 may be implemented as a standalone device that is relatively simple in terms of functional capabilities with limited input/output components, memory and processing capabilities. For instance, the robotic device 201 may not have a keyboard, keypad, or other form of mechanical input. Nor does it have a display or touch screen to facilitate visual presentation and user touch input. Instead, the device 201 may be implemented with the ability to receive and output audio, a network interface (wireless or wire-based), power, and limited processing/memory capabilities.

In the illustrated implementation, the robotic device 201 includes the microphone array 230, a speaker array 232, a processor 202, and memory 204. The microphone array 230 may be used to capture speech input from a user, or other sounds in the environment. The speaker array 232 may be used to output speech from a far end talker, audible responses provided by the cloud services, forms of entertainment (e.g., music, audible books, etc.), or any other form of sound. The speaker array 232 may output a wide range of audio frequencies including both human perceptible frequencies and non-human perceptible frequencies.

The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

Several modules such as instruction, datastores, and so forth may be stored within the memory 204 and configured to execute on the processor 202. An operating system module 206 is configured to manage hardware and services (e.g., wireless unit, USB, Codec) within and coupled to the device 201 for the benefit of other modules. Several other modules may be provided to process verbal input from a user. For instance, a speech recognition module 208 provides some level of speech recognition functionality. In some implementations, this functionality may be limited to specific commands that perform fundamental tasks like waking up the device, configuring the device, and the like. The amount of speech recognition capabilities implemented on the device 201 is an implementation detail, but the architecture described herein can support having some speech recognition at the local device 201 together with more expansive speech recognition using cloud services.

An acoustic echo cancellation module 210 and a double talk reduction module 212 are provided to process the audio signals to substantially cancel acoustic echoes and substantially reduce double talk that may occur. These modules may work together to identify times where echoes are present, where double talk is likely, where background noise is present, and attempt to reduce these external factors to isolate and focus on the near talker. By isolating on the near talker, better signal quality is provided to the speech recognition module 208 to enable more accurate interpretation of the speech utterances.

A query formation module 214 may also be provided to receive the parsed speech content output by the speech recognition module 208 and to form a search query or some form of request. This query formation module 214 may utilize natural language processing (NLP) tools as well as various language modules to enable accurate construction of queries based on the user's speech input.

The modules shown stored in the memory 204 are merely representative. Other modules 216 for processing the user voice input, interpreting that input, and/or performing functions based on that input may be provided.

The robotic device 201 might further include a codec 218 coupled to the microphones of the microphone array 230 and the speakers of the speaker array 232 to encode and/or decode the audio signals. The codec 218 may convert audio data between analog and digital formats. A user may interact with the device 201 by speaking to it, and the microphone array 230 captures the user speech. The codec 218 encodes the user speech and transfers that audio data to other components. The device 201 can communicate back to the user by emitting audible statements passed through the codec 218 and output through the speaker array 232. In this manner, the user interacts with the robotic device simply through speech, without use of a keyboard or display common to other types of devices.

The robotic device 201 includes a wireless unit 220 coupled to an antenna 222 to facilitate a wireless connection to a network. The wireless unit 220 may implement one or more of various wireless technologies, such as wifi, Bluetooth, RF, and so on.

A USB port 224 may further be provided as part of the device 201 to facilitate a wired connection to a network, or a plug-in network device that communicates with other wireless networks. In addition to the USB port 224, or as an alternative thereto, other forms of wired connections may be employed, such as a broadband connection. A power unit 226 is further provided to distribute power to the various components on the device 201.

The robotic device 201 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the robotic device 201 may include non-input control mechanisms, such as basic volume control button(s) for increasing/decreasing volume, as well as power and reset buttons. There may also be a simple light element (e.g., LED) to indicate a state such as, for example, when power is on. But, otherwise, the device 201 does not use or need to use any input devices or displays.

Accordingly, the device 201 may be implemented as an aesthetically appealing device with smooth and rounded surfaces, with some apertures for passage of sound waves, and merely having a power cord and optionally a wired interface (e.g., broadband, USB, etc.). In the illustrated implementation, the device 201 has a housing of an elongated cylindrical shape. Apertures or slots are formed in a base end to allow emission of sound waves. A more detailed discussion of one particular structure is provided below with reference to FIG. 3. Once plugged in, the device may automatically self-configure, or with slight aid of the user, and be ready to use. As a result, the device 201 may be generally produced at a low cost. In other implementations, other I/O components may be added to this basic model, such as specialty buttons, a keypad, display, and the like.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Figure 3:
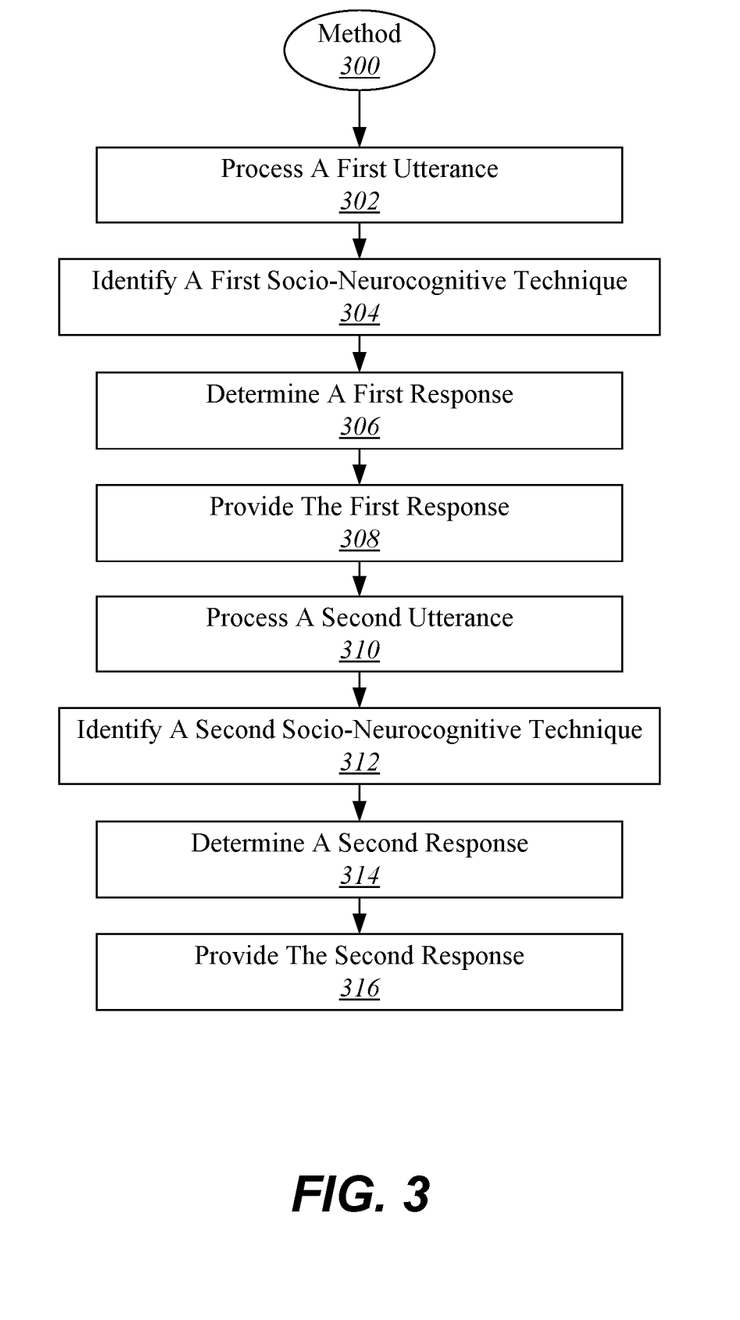
FIG. 3 is a flowchart illustrating language acquisition using socio-neurocognitive techniques.

FIG. 3 is a flowchart illustrating language acquisition using socio-neurocognitive techniques.

As shown in FIG. 3, at block 302 of method 300, a first utterance from a user is processed. At block 304, a first socio-neurocognitive technique is identified based on the first utterance. At block 306 a first response is determined using the first neurocognitive technique. At block 308, the first response is provided to the user. At block 310 a second utterance from the user is processed. At block 312, a second socio-neurocognitive technique based on the second utterance is identified. At block 314, a second response using the second neurocognitive technique is determined. At block 316, the second response is provided to the user.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A device comprising memory and processor configured to:

receive a first utterance from a user in a conversation;
process, using an audio input device, the first utterance from the user;
select a first socio-neurocognitive technique based on the first utterance;
obtain a selection of a language level and a topic from the user;
determine a first response using the first socio-neurocognitive technique, the obtained language level, the topic from the user, and an engagement level of the user from the first utterance;
provide the first response to the user;
receive a second utterance from the user in the same conversation;
process, using the audio input device, the second utterance from the user;
select a second socio-neurocognitive technique based on the second utterance, wherein the second socio-neurocognitive technique is different from the first socio-neurocognitive technique;
obtain selection of the language level and the topic from the user;
determine a second response using the second socio-neurocognitive technique, the obtained language level, the topic from the user topic, and the engagement level of the user from the second utterance;
provide the second response to the user;
receive a third utterance from the user in the same conversation;
process, using the audio input device, the third utterance from the user;
select a third socio-neurocognitive technique based on the third utterance, wherein the third socio-neurocognitive technique is different from the first socio-neurocognitive technique and the second socio-neurocognitive technique;
obtain selection of the language level and the topic from the user;
determine a third response using the third socio-neurocognitive technique, the obtained language level, the topic from the user, and the engagement level of the user from the third utterance;
provide the third response to the user;
receive a fourth utterance from the user in the same conversation;
process, using the audio input device, the fourth utterance from the user;
select a fourth socio-neurocognitive technique based on the fourth utterance, wherein the fourth socio-neurocognitive technique is different from the first socio-neurocognitive technique, the second socio-neurocognitive technique, and the third socio-neurocognitive technique;
obtain selection of the language level and the topic from the user;
determine a fourth response using the fourth socio-neurocognitive technique, the obtained language level, the topic from the user, and the engagement level of the user from the fourth utterance; and
provide the fourth response to the user.

2. The device of claim 1, wherein the first socio-neurocognitive technique, the second socio-neurocognitive technique, the third socio-neurocognitive technique, and the fourth socio-neurocognitive technique is one of a pictorial auditory technique, a multisensory drawing technique, a storytelling technique, or a circle rotation technique.

3. The device of the claim 1, wherein the user is one of a second language learning student or a patient with cognitive illness.

4. The device of claim 1, wherein the device is a robot configurable to process the first utterance according to a machine learning technique.

5. The device of claim 1, wherein the device includes a display device, and wherein the first response is provided as a visual notification.

6. The device of claim 1, wherein the device includes an audio output device, and wherein the second response is provided as an audio notification.

7. A method comprising:
receiving a first utterance from a user in a conversation;
processing, using an audio input device of a device, the first utterance from the user;
selecting a first socio-neurocognitive technique based on the first utterance;
obtaining a selection of a language level and a topic from the user;
determining a first response using the first socio-neurocognitive technique, the obtained language level, the topic from the user, and an engagement level of the user from the first utterance;
providing the first response to the user;
receiving a second utterance from the user in the same conversation;
processing, using the audio input device, the second utterance from the user;
selecting a second socio-neurocognitive technique based on the second utterance, wherein the second socio-neurocognitive technique is different from the first socio-neurocognitive technique;
obtaining selection of the language level and the topic from the user;
determining a second response using the second socio-neurocognitive technique, the obtained language level, the topic from the user topic, and the engagement level of the user from the second utterance;
providing the second response to the user;
receiving a third utterance from the user in the same conversation;
processing, using the audio input device, the third utterance from the user;
selecting a third socio-neurocognitive technique based on the third utterance, wherein the third socio-neurocognitive technique is different from the first socio-neurocognitive technique and the second socio-neurocognitive technique;
obtaining selection of the language level and the topic from the user;
determining a third response using the third socio-neurocognitive technique, the obtained language level, the topic from the user, and the engagement level of the user from the third utterance;
providing the third response to the user;
receiving a fourth utterance from the user in the same conversation;
processing, using the audio input device, the fourth utterance from the user;
selecting a fourth socio-neurocognitive technique based on the fourth utterance, wherein the fourth socio-neurocognitive technique is different from the first socio-neurocognitive technique, the second socio-neurocognitive technique, and the third socio-neurocognitive technique;
obtaining selection of the language level and the topic from the user;
determining a fourth response using the fourth socio-neurocognitive technique, the obtained language level, the topic from the user, and the engagement level of the user from the fourth utterance; and
providing the fourth response to the user.

8. The method of claim 7, wherein the first socio-neurocognitive technique, the second socio-neurocognitive technique, the third socio-neurocognitive technique, and the fourth socio-neurocognitive technique is one of a pictorial auditory technique, a multi sensory drawing technique, a storytelling technique, or a circle rotation technique.

9. The method of claim 7, wherein the user is one of a second language learning student or a patient with cognitive illness.

10. The method of claim 7, wherein the device is a robot configurable to process the first utterance according to a machine learning technique.

11. The method of claim 7, wherein the device includes a display device, and wherein the first response is provided as a visual notification.

12. The method of claim 7, wherein the device includes an audio output device, and wherein the second response is provided as an audio notification.

13. A computer program product comprising one or more non-transitory computer-readable media having computer instructions stored therein, the computer program instructions being configured such that, when executed by one or more computing devices, the computer program instructions cause the one or more computing devices to: processor configured to:
receive a first utterance from a user in a conversation;
process, using an audio input device of a device, the first utterance from the user;
select a first socio-neurocognitive technique based on the first utterance;
obtain a selection of a language level and a topic from the user;
determine a first response using the first socio-neurocognitive technique, the obtained language level, the topic from the user, and an engagement level of the user from the first utterance;
provide the first response to the user;
receive a second utterance from the user in the same conversation;
process, using the audio input device, the second utterance from the user;
select a second socio-neurocognitive technique based on the second utterance, wherein the second socio-neurocognitive technique is different from the first socio-neurocognitive technique;
obtain selection of the language level and the topic from the user;
determine a second response using the second socio-neurocognitive technique, the obtained language level, the topic from the user topic, and the engagement level of the user from the second utterance;
provide the second response to the user;
receive a third utterance from the user in the same conversation;
process, using the audio input device, the third utterance from the user;
select a third socio-neurocognitive technique based on the third utterance, wherein the third socio-neurocognitive technique is different from the first socio-neurocognitive technique and the second socio-neurocognitive technique;
obtain selection of the language level and the topic from the user;

determine a third response using the third socio-neurocognitive technique, the obtained language level, the topic from the user, and the engagement level of the user from the third utterance;

provide the third response to the user;

receive a fourth utterance from the user in the same conversation;

process, using the audio input device, the fourth utterance from the user;

select a fourth socio-neurocognitive technique based on the fourth utterance, wherein the fourth socio-neurocognitive technique is different from the first socio-neurocognitive technique, the second socio-neurocognitive technique, and the third socio-neurocognitive technique;

obtain selection of the language level and the topic from the user;

determine a fourth response using the fourth socio-neurocognitive technique, the obtained language level, the topic from the user, and the engagement level of the user from the fourth utterance; and provide the fourth response to the user.

14. The computer program product of claim 13, wherein the first socio-neurocognitive technique, the second socio-neurocognitive technique, the third socio-neurocognitive technique, and the fourth socio-neurocognitive technique is one of a pictorial auditory technique, a multisensory drawing technique, a storytelling technique, or a circle rotation technique.

15. The computer program product of claim 13, wherein the user is one of a second language learning student or a patient with cognitive illness.

16. The computer program product of claim 13, wherein the device is a robot configurable to process the first utterance according to a machine learning technique.

17. The computer program product of claim 13, wherein the device includes a display device and an audio output device, and wherein the first response is provided as a visual notification and the second response is provided as an audio notification.

* * * * *